Feb. 8, 1966   C. J. STALEGO   3,233,989
METHOD AND APPARATUS FOR FORMING FIBERS
Filed March 31, 1961   4 Sheets-Sheet 1
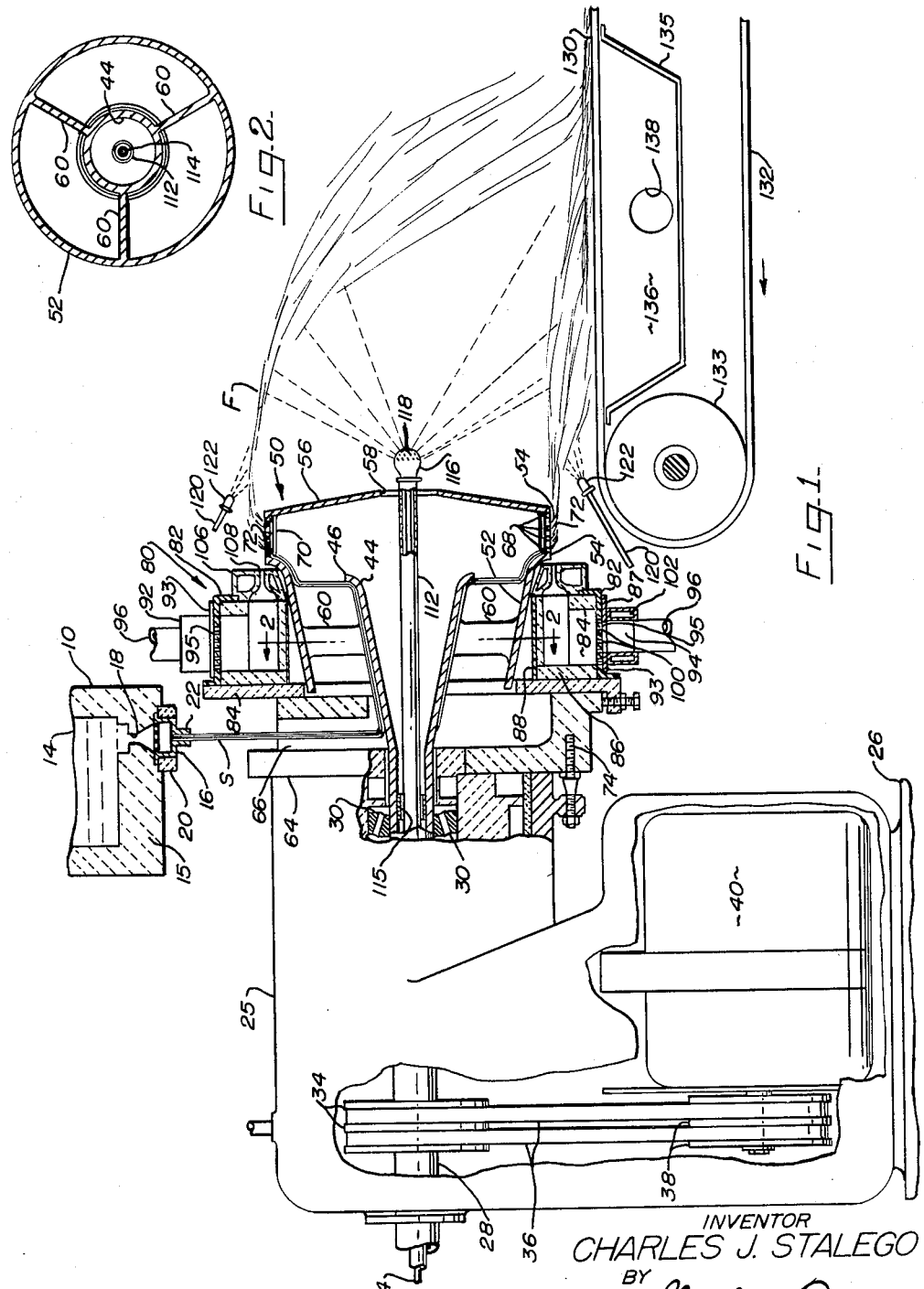
INVENTOR
CHARLES J. STALEGO
BY
Stachie & Overman
ATTORNEYS.

Feb. 8, 1966  C. J. STALEGO  3,233,989
METHOD AND APPARATUS FOR FORMING FIBERS
Filed March 31, 1961  4 Sheets-Sheet 2
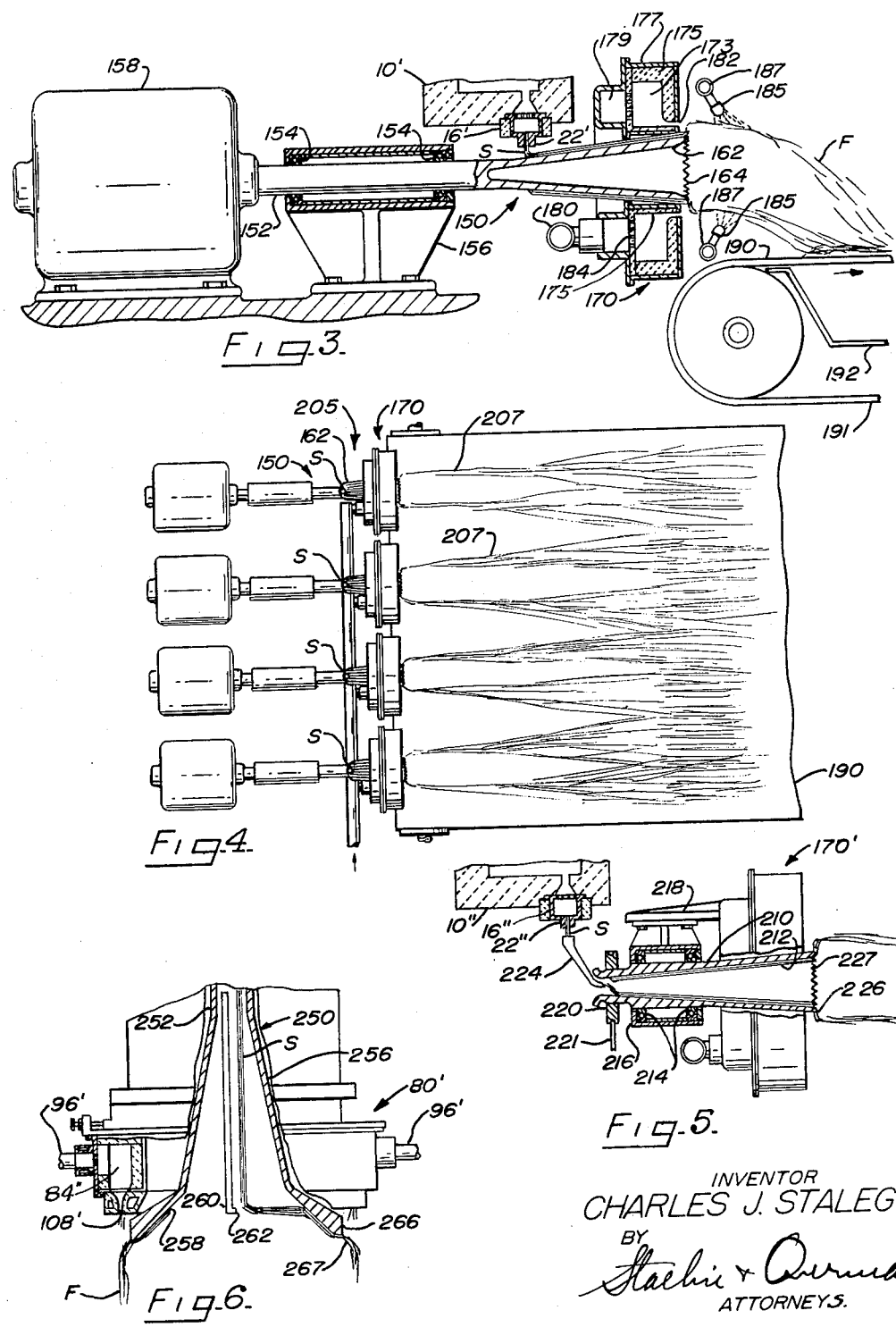
INVENTOR
CHARLES J. STALEGO
ATTORNEYS.

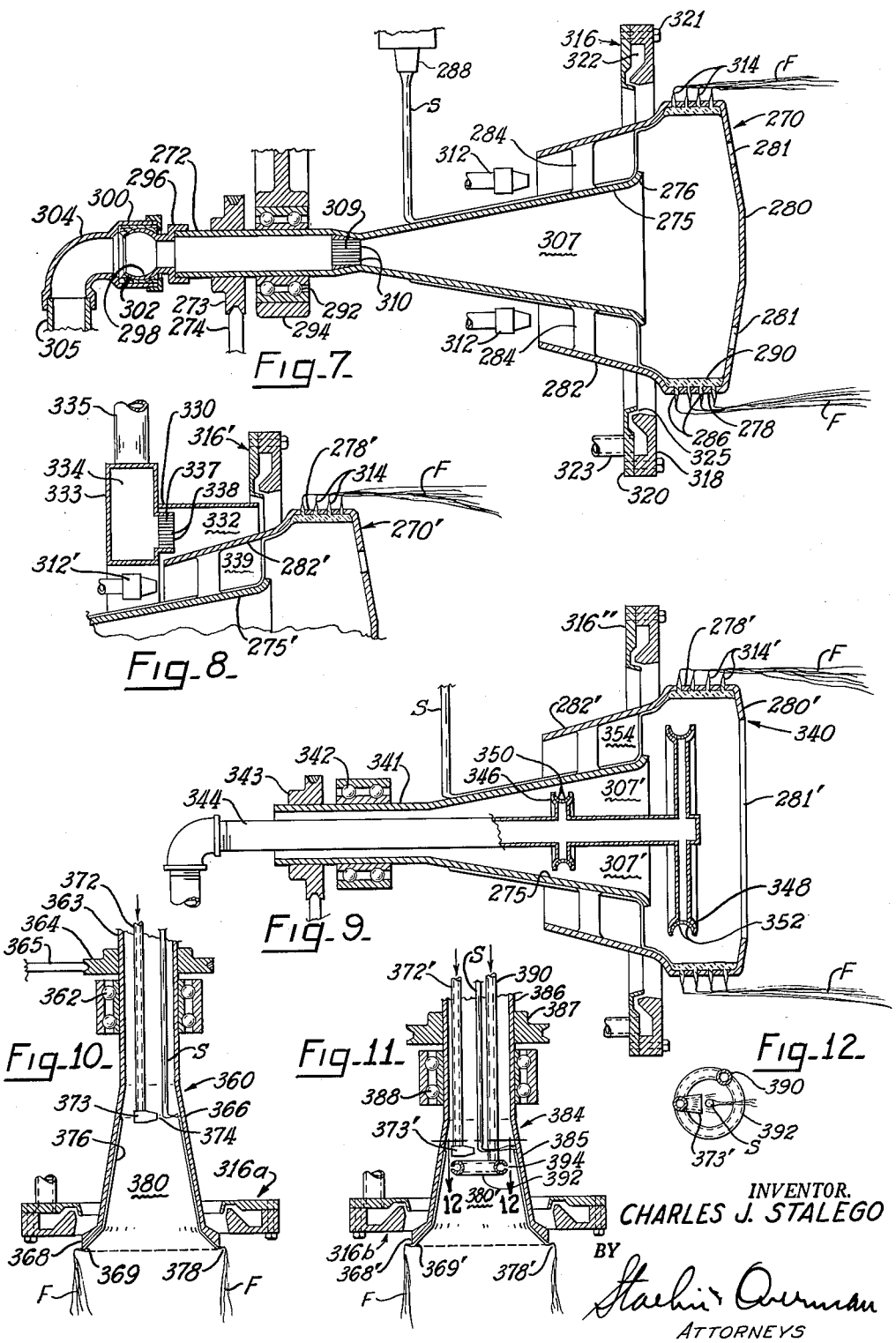

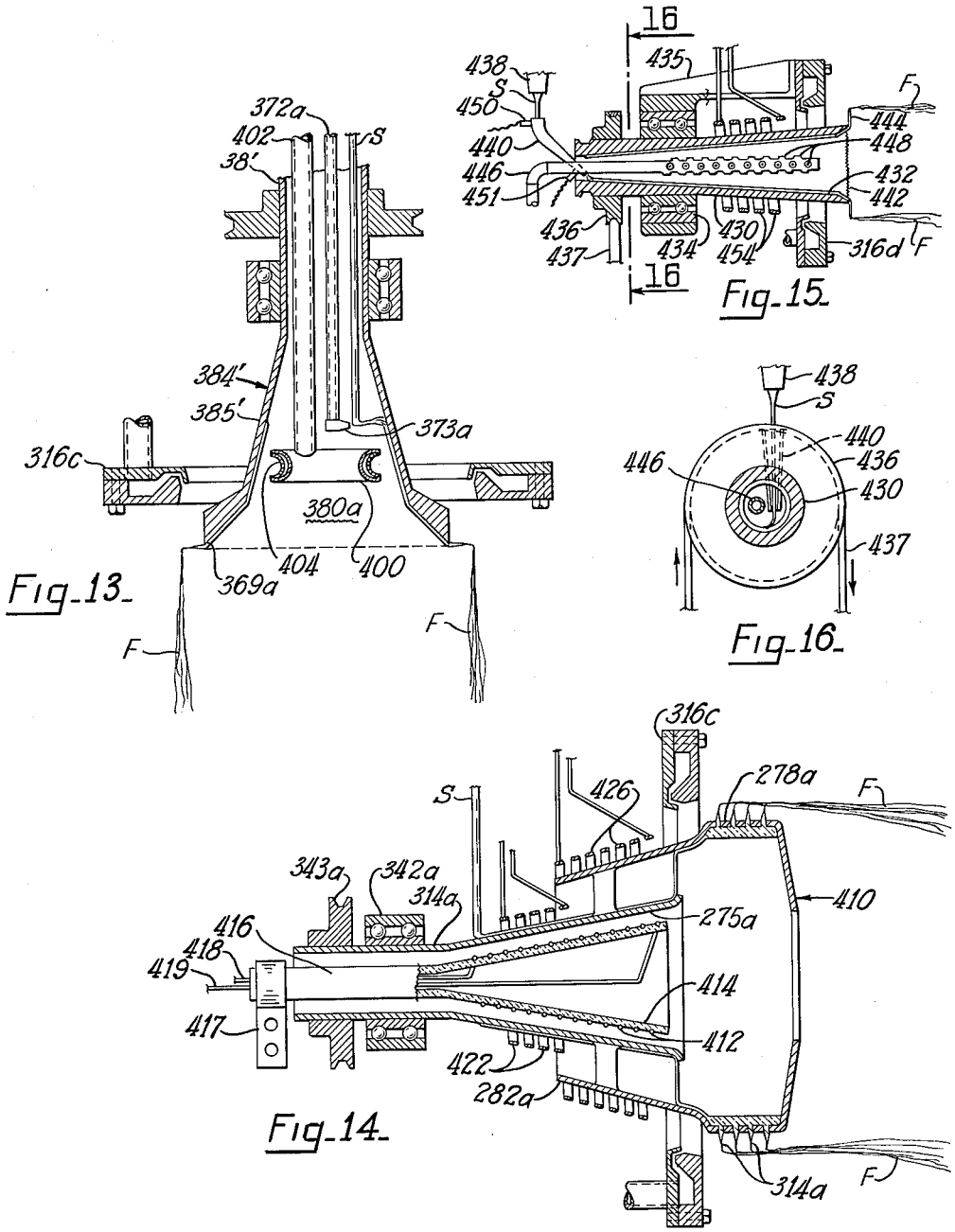

United States Patent Office 3,233,989
Patented Feb. 8, 1966

3,233,989
METHOD AND APPARATUS FOR
FORMING FIBERS
Charles J. Stalego, Newark, Ohio, assignor to Owens-Corning Fiberglas Corporation, a corporation of Delaware
Filed Mar. 31, 1961, Ser. No. 99,820
7 Claims. (Cl. 65—6)

This application is a continuation-in-part of my co-pending application Serial No. 543,555, filed October 28, 1955, and now Patent No. 2,980,952 issued April 25, 1961.

This invention relates to method and apparatus for forming, treating and collecting fibers and more especially to a method and apparatus for producing fibers from heat-softenable mineral material, such as glass, slag, fusible rock or the like, collecting the fibers and continuously conveying them away from the fiber-forming zone.

Heretofore it has been commercial practice to form glass fibers by engaging one or more gaseous blasts with vertical streams of molten glass wherein the blast attenuated fibers move downwardly or descend from the attenuating zone and are collected upon a substantially horizontal moving conveyor. Steam and compressed air blasts have been used for this purpose.

Another method heretofore used involves the steps of drawing glass streams into solidified rods or primary filaments and feeding the solidified material into a gaseous blast of a temperature above the attenuating temperature of the glass whereby the solidified rods or filaments are softened by the heat of the blast and the softened material attenuated to fibers by the velocity of the blast.

The method utilizing steam or compressed air blasts produces relatively coarse fibers and, while the hot blast method products fine fibers, the latter method is relatively expensive due to the substantial amounts of heat energy required to soften the solidified rods to an attenuating temperature.

Centrifugal means have been used to form elongated bodies projected horizontally and engaged by downwardly directed gaseous blasts whereby the bodies of glass are attenuated to fibers. The centrifugal means heretofore used for carrying out this method includes a cylindrical rotor having a periphery formed with small openings through which molten glass or other molten material is extruded in the form of elongated bodies by centrifugal force and the bodies delivered into the attenuating blast. Such arrangements require special means disposed within the rotor for distributing the vertical stream of molten material horizontally into contact with the rotor wall preparatory to the extrusion of the material through the openings.

This invention embraces a method of forming molten glass or other fiber forming material into elongated bodies and attenuating the bodies to fibers by a high velocity gas stream whereby the fibers may be collected adjacent the fiber attenuating zone, the entire process being carried out in a minimum of space.

An object of the invention resides in a method of directly forming molten fiber-forming material into primary filaments or elongated bodies moving outwardly from a horizontal axis and engaging the outwardly moving bodies with a horizontally directed high velocity blast to form fibers which may be advantageously collected in a mat formation upon a surface adjacent the attenuating zone.

Another object of the invention resides in a fiber-forming apparatus embodying a rotating element formed with a flared or frusto-conically shaped surface upon which a stream of molten material is delivered and formed by centrifugal force into bodies which are attenuated to fibers by a high velocity gaseous blast and wherein the bodies may be discharged from the element rotating about a vertical axis, horizontal axis or about an axis arranged in other angular positions.

Another object of the invention is the provision of an apparatus for attenuating bodies of fiber-forming material by an annularly shaped horizontally directed gaseous blast and a fiber coating material or binder delivered onto the newly formed fibers from means disposed within the zone defined by the annular blast whereby the coating material or binder is dispersed onto the fibers to provide for the homogeneous distribution of the binder or coating material in and throughout the mat of fibers.

Another object of the invention is the provision of a fiber-forming apparatus wherein the fibers are formed by means moving in directions whereby a reduction is effected in the space required for the apparatus utilized for carrying on the method.

Another object of the invention is the provision of rotatable means for forming fibers by centrifugal forces in which the rotatable means is of comparatively small diameter adapted to rotate at extremely high speeds whereby fibers may be formed directly from a molten fiber-forming material.

Another object of the invention embraces a method and apparatus wherein molten fiber-forming material may be deposited upon a flaring surface of a member rotating at high speed and discharged therefrom by centrifugal forces in the form of fibers or linear bodies which may be further attenuated to finer fibers by an attenuating blast.

Still another object is the provision of comparatively small and compact fiber-forming units which may be arranged in close proximity in groups whereby a fibrous mat of desired width may be formed by concomitantly collecting the fibers formed by the several units without the employment of special means for effecting distribution of the fibers.

Still another object of the invention is the provision of a fiber collecting means which may be disposed adjacent the fiber attenuating region and wherein a subatmospheric pressure is established adjacent the fiber collecting surface to foster the collection of the fibers without impairing their natural orientation in an attenuating blast and for conveying away the spent gases of the blast.

A further object of the invention is the provision of a method and means for directing or applying heat to the rotor structure or to the glass or other heat-softened material in contact with the rotor to maintain the glass or other material in a flowable state or condition.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an elevational view of a form of apparatus of the invention for forming and collecting fibers, certain parts being shown in section;

FIGURE 2 is a transverse sectional view taken substantially on the line 2—2 of FIGURE 1;

FIGURE 3 is a vertical sectional view showing another form of apparatus for carrying out the method of the invention;

FIGURE 4 is a top plan view showing a plurality of fiber forming units utilized for forming a fibrous mat of substantial width;

FIGURE 5 is a vertical sectional view of a modified form of apparatus for carrying out the method of the invention;

FIGURE 6 is a vertical sectional view showing another form of apparatus for carrying out the method of the invention;

FIGURE 7 is a longitudinal sectional view of a rotor and blast producing arrangement associated with means for applying heat to the rotor or the glass in contact with the rotor;

FIGURE 8 is a fragmentary sectional view illustrating one form of heating means for applying heat to a rotor structure;

FIGURE 9 is a longitudinal sectional view similar to FIGURE 7 illustrating heating means contained within the rotor structure;

FIGURE 10 is a sectional view of a vertically arranged rotor associated with means for distributing the glass by combustible mixture and the mixture burned within the rotor;

FIGURE 11 is a sectional view of a vertically arranged rotor with means for applying heat interiorly of the rotor;

FIGURE 12 is a detail sectional view taken substantially on the line 12—12 of FIGURE 11;

FIGURE 13 is a sectional view of a vertically arranged rotor with a burner disposed within the rotor;

FIGURE 14 is a horizontally arranged rotor with means for applying heat interiorly and exteriorly of the rotor;

FIGURE 15 is a sectional view illustrating another form of apparatus, and

FIGURE 16 is a sectional view taken substantially on the line 16—16 of FIGURE 15.

While the method and apparatus of the invention are particularly usable for forming fibers from glass, it is to be understood that the arrangement may be used for forming fibers from other materials, such as slag, fusible rock, plastics, resins or the like.

Referring to the drawings in detail FIGURES 1 and 2 illustrate one form of apparatus of the invention. In FIGURE 1 there is shown a forehearth 10 which is associated or connected with a melting furnace or receptacle (not shown) in which glass batch or other heat-softenable fiber-forming material is reduced to a flowable condition by the application of heat providing a supply of molten material 14 in the forehearth.

Secured to the bottom wall or floor 15 of the forehearth is a feeder or bushing 16 adapted to receive molten material through a passage 18 in the floor 15. The feeder is secured to the forehearth 10 by means of a supporting ring or block 20. The feeder 16 is formed with a projection or tip 22 having an orifice or outlet through which flows a stream S of fiber-forming material which is delivered to a fiber-forming apparatus.

The fiber-forming apparatus includes a rotor or member adapted for rotation about a substantially horizontal axis for projecting bodies of the molten material endwise into a high velocity gas stream or attenuating blast.

The apparatus includes a frame or housing 25 which may be mounted upon a suitable support 26. A hollow shaft 28 disposed in a substantially horizontal position is mounted in bearings 30 carried by the housing structure 25. The hollow shaft 28 is equipped with sheaves 34 which are connected by driving belts 36 with sheaves 38 driven by a suitable motor 40 or other source of power. The motor 40 may be adjustably mounted by means (not shown) for regulating the tension of the driving belts 36. The speed of rotation of the shaft 28 may be varied by employing sheaves of different diameters or a variable speed changing mechanism of conventional character may be used.

The cylindrical portion of the shaft 28 is integrally joined with a flared or frusto-conically shaped portion 44 which terminates in an outwardly extending flange 46 and forms a component or part of the rotor construction or spinner 50. The rotor or rotatable member 50 is inclusive of a frusto-conically shaped or flared portion 52 spaced from the frusto-conically shaped portion 44 of the shaft 28, the portion or wall 52 being joined with a peripheral circular cylindrical wall 54.

The rotor is formed with an end wall 56 integrally joined to the peripheral wall 54, the end wall 56 being formed with a central circular opening 58. As shown in FIGURE 2, the frusto-conically shaped wall 52 is integrally joined with the wall 44 by means of spokes or ribs 60.

Secured to the housing 25 is a plate or member 64 formed with a passage 66 through which flows the stream S of glass or other fiber-forming material into contact with the exterior surface of the frusto-conically shaped element 44. The peripheral wall 54 of the rotor 50 is formed with a large number of small orifices or openings 68 through which molten glass or other mineral material is extruded under the influence or centrifugal forces to form elongated bodies, fine streams or filaments of the molten material.

Due to the centrifugal forces arising by rotation of the shaft 28, portion 44 and the rotor 50, the glass of the stream S engaging the flaring or frusto-conically shaped wall 44 moves outwardly of the axis of rotation and upwardly along the wall 44 as shown in FIGURE 1. The molten material is then abruptly deflected or diverted outwardly by the flange 46 whereby the molten material impinges upon the surface 52 and traverses the surface outwardly of the axis of rotation and collects in a film or layer 70 in a material distributing zone defined by the circular wall 54. The molten material collected at 70 in the rotor flows outwardly through the orifice 68 to form fine streams, elongated bodies or primaries 72 of the material which are attenuated to fine fibers by a high velocity gaseous blast.

The plate 64 is secured to the housing 25 by means of stud bolts 74 and a blast establishing means or burner 80 is supported by the plate. As particularly shown in FIGURE 1 the burner or blast producing means 80 is formed with a metal casing 82 which is secured to a plate 84, the latter being connected to the plate 64 by suitable means (not shown).

The burner 80 is preferably formed with a plurality of radially arranged burner units including combustion chambers or confined zones 84 which are symmetrically disposed about the axis of the shaft 28. Each of the combustion chambers or zones 84 is defined or bounded by vertically arranged partitions (not shown) and walls 86, 87 and 88. The walls 86, 87 and 88 are formed of high temperature refractory to resist the elevated temperatures of the burning gases within the chambers.

Secured to the peripheral region of the burner and adjacent each of the combustion chambers or units is a manifold construction 92 containing a chamber 94. Each of the manifold chambers 94 is connected by means of a tube or duct 96 with a supply of combustible mixture for delivery into the combustion chambers. Each manifold casing 92 is substantially rectangular and is mounted on or carried by a plate 93 which is bolted or otherwise secured to the metal casing 82. The manifold construction may be a continuous pipe or chamber in communication with the combustion chambers at spaced zones.

An outer wall 95 of each of the combustion chambers 84 is formed with a plurality of small openings 100 through which mixture from the manifold chamber 94 is conveyed into the adjacent combustion chamber. The perforated zone of the wall 95 forms a protective fire screen to prevent preignition of the mixture in the manifold or supply pipe.

Each of the manifolds is preferably surrounded with a cooling jacket or chamber 102 through which water or other temperature controlling fluid may be circulated to cool the manifold.

The fuel component of the combustible mixture may be a fuel gas, such as ethane, methane or propane, the fuel being mixed with the requisite amount of air to support combustion. The combustible mixture is introduced into the combustion zones under comparatively low pressures of from three to ten pounds per square inch. A valve means (not shown) may be provided for each of the mixture supply pipes 96 for controlling the delivery of combustible mixture into each of the combustion units.

The burner construction 80 is provided with orifice means for discharging burned gases or products of combustion from the combustion chambers 84 as an intensely hot high velocity blast of a temperature above the attenuating temperature of the glass or other fiber-forming material. The burning gases in the chambers 84 attain temperatures of upwards of 3000° F. or more. The orifice construction is inclusive of a member 106 provided with restricted orifices or outlets 108 through which the burning gases from the combustion chambers are discharged to form the blast.

The orifices 108 associated with the combustion chambers 84 are arranged in a substantially annular pattern or relation to provide a substantially annularly shaped blast projected horizontally and in substantially concentric relation with and adjacent to the peripheral wall 54 of the rotor 50. The elongated bodies, streams or primaries 72 of the glass or other fiber-forming material extruded from the orifices 68 in the circular wall 54 are delivered or projected endwise into the annular blast of intensely hot gases emanating from the orifices 108, the blast attenuating the material into fine fibers F which move for a comparatively short distance away from the rotor in a hollow column or beam formation substantially concentric with the periphery of the spinner 50.

The gases of the blast moving away from the source or orifice 108 gradually expand and the velocity is reduced so that the fibers may readily be collected upon a suitable surface.

The rotor or spinner 50 is revolved at a speed to establish centrifugal forces adequate to extrude the molten glass or other material through the orifices 68 in the spinner so that the fine streams, primaries or elongated bodies 72 are projected outwardly of the peripheral wall of the rotor and enter the blast in directions substantially normal to the blast. It has been found that a spinner or rotor of from seven to nine inches in diameter should be rotated at three thousand revolutions per minute or more in order to properly extrude the molten material through the openings or orifices 68. The stream of material S should be of sufficient size and its delivery at a rate sufficient to maintain an annular film or layer of the molten material over the entire interior region of the openings 68 in order to assure extrusion or delivery of uniform streams, primary filaments or elongated bodies from all of the openings in the spinner wall.

The arrangement of the invention is inclusive of a means or method of conveying a lubricant, binder or other fiber coating material through the rotor and dispersing or distributing the same onto the fibers while they are entrained in the blast. Extending through the interior of the hollow shaft 28 is a binder or fiber coating conveying means in the form of a tube or pipe 112 within which is disposed a second tube or pipe 114. The tubes 112 and 114 are relatively stationary.

Bearing members or sleeves 115 may be disposed between the tube or pipe 112 and the interior surface of the hollow shaft 28 to properly maintain the tube 112 at the axis of rotation of the shaft 28 and rotor 50.

The binder conveying means extends through the hollow shaft 28 and through the opening 58 in the end wall 56 of the rotor and is provided with an applicator or nozzle construction 116 having orifices 118 through which the lubricant, binder or coating material is sprayed or distributed onto the fibers F.

The binder may be conveyed to the applicator through the tube or pipe 114 and a fluid vehicle, such as compressed air, may be conveyed to the applicator through the annular chamber provided between the interior wall surface of the pipe 112 and the exterior surface of the pipe 114. The compressed air entrains the binder or coating material in the applicator 116 and carries the binder or material through the orifices 118 onto the fibers.

For certain uses it is desirable to coat the fibers with a lubricant, such as mineral oil or the like, and it may be distributed or sprayed onto the fibers in the manner above described. When it is desired to form a mat of the fibers having a degree of mass integrity or to bond the fibers together a thermosetting or a thermoplastic binder may be used. Thermosetting binders are preferred and materials such as phenolformaldehyde or ureaformaldehyde have been found to be satisfactory.

When a thermosetting binder is applied, the binder impregnated mat of fibers is conveyed through a suitable heating zone or oven (not shown) for setting the binder. By conveying the lubricant, binder or other coating material through the rotor and applying the material to the beam or annular formation of fibers from an interior central zone, the natural orientation of the fibers in the beam is not impaired or disturbed.

If desired, lubricant, binder or coating material may be applied exteriorly of the beam of fibers. As shown in FIGURE 1, pipes or tubes 120 equipped with applicators 122 may be spaced circumferentially of the beam of fibers exteriorly thereof for the purpose.

Arranged forwardly of the rotor 50 and adjacent the path of flight of the attenuated fibers is a means for collecting the fibers into a mass or mat formation. As shown in FIGURE 1, the fibers are collected upon the upper flight 130 of an endless conveyor 132 of the foraminous or reticulated type which is supported upon rollers 133, one of which is shown. The conveyor may be driven by a motor (not shown) or any suitable means.

A box or receptacle 135 is disposed beneath the upper flight of the conveyor and in registration with the path of the descending fibers and provides a chamber 136 connected by a tube or pipe 138 with a suction blower or other means of obtaining reduced or subatmospheric pressure in the chamber 136. The suction or reduced pressure in the chamber 136 assists in collecting the fibers upon the conveyor and carries away spent gases of the attenuating blast.

The operation of the apparatus of FIGURES 1 and 2 is as follows: The stream S of molten glass or other flowable fiber-forming material is delivered onto the exterior surface of the cone-shaped portion 44 of the hollow shaft 28, the latter being rotated at a comparatively high speed by the motor 40. The material of the stream engaging the rotating cone-shaped surface adheres to the surface and, under the influence of centrifugal forces, flows or moves outwardly of the axis of rotation along the exterior surface of the flared portion or cone 44 until it engages the flange 46.

The path of the molten material is modified and diverted by the flange 46, the material being projected outwardly by centrifugal forces of rotation and away from the flange 46 into engagement with the interior surface of the flaring wall 52, the material moving along the flaring wall into contact with the circular wall 54. The outwardly moving material collects upon the interior of the rotor wall 54 forming an annular layer of film 70 of material covering the orifices or openings 68 in the wall 54.

The molten glass or other material, under the influence of centrifugal forces, is extruded or projected through the orifices or openings 68 forming fine streams, primary filaments or elongated bodies 72 which enter the annular gaseous blast emanating from the orifices 108, the material being attenuated to fine fibers by the heat and velocity of the blast. The blast entrains and conveys the fibers away from the attenuating zone and, as the velocity of the blast diminishes, the fibers descend by gravity onto the conveyor flight 130 assisted by the suction or reduced pressure existent in the chamber 136.

It is to be understood that the burner or blast producing arrangement may be constructed to provide single substantially annular combustion chamber or confined zone functioning in conjunction with an annularly shaped restricted orifice through which the burned gases or products of combustion may be discharged as an uninterrupted annular blast. The binder may be delivered onto the fibers interiorly of the beam of fibers or exteriorly thereof or simultaneously from both zones onto the fibers. The arrangement illustrated in FIGURE 1 effects attenuation of the fibers in an open zone, but a hood or other enclosure may be employed at the fiber-forming and collecting zone if desired.

It should be noted that the forehearth 10 may be positioned close to the fiber-forming unit and due to the attenuation operation being carried on in substantially horizontal directions, the arrangement is quite compact effecting a substantial saving in space requirements for the fiber-forming and collecting operations.

FIGURE 3 illustrates a modified form of apparatus for carrying out the method of the invention. The rotor or rotatable member 150 is formed with a shaft portion 152 journalled in suitable bearings 154 mounted in a support or housing 156, the shaft 152 being driven by a motor 158. The rotor 150 is formed with a flared or frusto-conically shaped portion or section 162. The angle of taper of the flared portion 162 relative to the axis of rotation is relatively small and is preferably from one to ten degrees depending upon the speed of rotation. The end zone of the flared portion may be serrated as shown at 164 to facilitate the outward distribution of fiber-forming material into elongated bodies.

Disposed above and close to the rotor 150 is a forehearth 10' which contains a supply of molten glass or other heat-softened fiber-forming material. The forehearth 10' is provided with a feeder or bushing 16' having a downwardly extending projection or tip 22' formed with an orifice through which flows a stream S of glass or other molten material. The stream S is delivered onto the flared or frusto-conically shaped portion of the rotor at the zone of small diameter as shown in FIGURE 3.

The rotatable member 150 is continuously rotated and acquires a layer or film of glass from the stream through a shearing action. Centrifugal forces set up by rotation of the rotor 150 causes the molten glass or other material to be moved along the flared surface of the rotor in the direction of the progressively increasing diameter thereof, and is discharged outwardly of the end of the rotor as shown in FIGURE 1.

The arrangement shown in FIGURE 3 includes a rotor construction of relatively small diameter and the discharge end of the flared portion of the rotor may be one-half inch or less in diameter. The rotor is adapted to be rotated at extremely high speeds of, for example, fifty thousand to one hundred fifty thousand revolutions per minute or more. A rotor of small diameter may be rotated at relatively high speeds without liability of fracture or breakage of the rotor by centrifugal forces. The molten glass or other molten material delivered onto the flared surface of the rotor tends to cling or adhere to the flared surface and to move outwardly toward the progressively larger diameter and, upon reaching the end zone, is projected outwardly of the end of the rotor in a plane normal to the axis of rotation by centrifugal forces and the movement of more glass along the flared or conically-shaped surface toward the discharge end of the rotor.

The glass is dispelled from the end of the rotor in the form of linear bodies or fibers as the high speed of rotation is sufficient to cause the projection of the material at a rate of speed such as to effect substantial attenuation of the bodies leaving the rotor as to directly form fibers or filaments. These may be collected in any suitable manner.

It is, however, desirable to produce finer fibers than are attainable solely from centrifugal attenuation of the molten fiber-forming material. In order to obtain fine fibers the arrangement illustrated in FIGURE 3 includes a burner or blast producing means 170 which is adapted to provide a high velocity gaseous blast of a temperature above the attenuating temperature of the fiber-forming material. The burner 170 is of a construction similar to the burner 80 shown in FIGURE 1 but of a much smaller size. The burner shown in FIGURE 3 includes a combustion chamber 173 of generally annular configuration defined by refractory walls 175 and enclosed within a metal casing 177.

The burner is provided with an annular manifold 179 which receives a combustible mixture from a supply through a duct or pipe 180. The burner is formed with a restricted orifice 182 of generally annular configuration disposed substantially concentric with the axis of the rotor 150. The combustible mixture in the manifold 179 is delivered into the combustion chamber or zone 173 through the orifices or openings in the perforated wall 184 defining the rear wall of the burner chamber. The combustible mixture is introduced into the combustion zone under comparatively low pressure, preferably between three to ten pounds per square inch, the mixture being substantially completely burned in the chamber 173.

The intensely hot products of combustion at temperatures of upwards of 3000° F., well above the attenuating temperature of the glass, are discharged through the restricted orifice 182 as an intensely hot high velocity annular blast. The blast engages the outwardly moving fibers or bodies discharged from the end zone of the flared portion of the rotor and are attenuated by the blast to form very fine fibers.

It may be desirable to distribute a bonding agent or binder onto the newly formed fibers and this may be accomplished by providing applicators or nozzles 185 adapted to project or spray binder onto the newly formed fibers. The binder may be conducted to the applicators through manifolds or supply tubes 187. The fibers F may be collected upon the upper flight 190 of a conveyor 191, the reduced pressure in a suction box 192 disposed beneath the fiber collecting zone of the conveyor assisting in the deposition of the fibers upon the conveyor and disposing of the spent gases of the blast.

FIGURE 4 is illustrative of a group or battery of fiber-forming units of the character shown in FIGURE 3 wherein the units are arranged in close proximity one with another for producing a mass or mat of fibers of predetermined width. The fiber-forming units are illustrated at 205 and the streams S of glass are delivered onto the flared portions 162 of the rotors 150. The units are placed in transverse alignment as shown in FIGURE 4, each unit delivering a beam 207 of fibers onto the upper flight 190 of the foraminous conveyor 191.

Through the provision of a group of the fiber attenuating units, the fibers formed by the several units are concomitantly collected so as to provide a fibrous mass or mat of predetermined width and the collection of fibers takes place without impairing or disturbing the natural orientation of the fibers entrained in the blasts.

As the rotors 150 may be operated at extremely high speeds, a substantial amount of glass may be converted into fibers by reason of the rapid delivery or discharge of the fiber-forming material from the rotors and the immediate blast attenuation of the material to fine fibers.

FIGURE 5 is illustrative of a modified form of apparatus for carrying out the method of the invention. In this form the rotor 210 is formed with an interior surface 212 of flaring or frusto-conical shape. The rotor is supported in antifriction bearings 214 carried within a bearing cage or housing 216 mounted upon a support 218. The rotor 210 is equipped with a sheave or pulley 220 driven by a belt 221 from a motor (not shown) or other source of power. The rotor is of comparatively small diameter, the large end of which may be one-half inch or less in diameter and is adapted to be rotated at extremely high speeds.

A forehearth 10" is provided with a feeder or bushing 16" equipped with a tip or projection 22" formed with an orifice through which flows a stream S of glass or other molten fiber-forming material. The glass stream is delivered into a spout or trough 224, the end of which projects into the zone of smallest diameter of the rotor 210 whereby the molten glass is delivered into the interior of the rotor.

Under the influence of centrifugal forces of high speed rotation, the glass or other molten material introduced at the small end of the rotor moves progressively toward the end of large diameter along the frusto-conically shaped surface 212. The molten material adjacent the large end of the rotor is discharged outwardly by centrifugal forces in a plurality of linear bodies, filaments or fibers 226. The end zone of discharge of the rotor may be serrated as shown at 227 in order to facilitate the formation of the glass into linear bodies.

A burner 170' of the same construction as burner 170 shown in FIGURE 3 is disposed adjacent to and surrounding the rotor 210 and is adapted to establish an annular blast of intensely hot gases which are discharged from the combustion chamber of the burner through a restricted orifice. The gaseous blast engages the outwardly moving bodies projected from the end of the rotor 212 to attenuate them to fine fibers which may be collected in the manner illustrated in FIGURE 3 or by other suitable means.

While the rotors illustrated in FIGURES 3, 4 and 5 are disposed for rotation about horizontal axes, it is to be understood that they may be disposed for rotation about upwardly or downwardly inclined axes or any position in which the molten material may be delivered onto the flared exterior or interior surfaces of the rotors.

FIGURE 6 illustrates a form of apparatus for attenuating molten glass or other heat-softened material to fibers wherein the rotor having a flared or frusto-conical configuration is particularly adapted for rotation about a vertical axis. The rotor 250 is of hollow configuration to receive a glass stream S delivered into the interior of the rotor from a feeder or bushing of the character shown in FIGURE 1. The cylindrical or shaft portion 252 of the rotor may be equipped with sheaves driven from a motor in the manner as illustrated in the apparatus as shown in FIGURE 1 with exception that the motor and rotor rotate about vertical axes.

The rotor 250 is formed with a flared or frusto-conically shaped configuration 256 which is joined with another flared or frusto-conically shaped surface portion 258 of greater taper or angularity with respect to the axis of the rotor. The arrangement shown in FIGURE 6 includes a means for directing or distributing the glass of the stream S into engagement with the flared surface 258 of the rotor. A tube or pipe 260 extends downwardly through the interior of the rotor and is equipped with a nozzle construction or jet 262 adapted to discharge a jet or blast of compressed air or other fluid.

The blast of gas from the nozzle 262 moves in a direction substantially normal to the path of flow of the stream S, the blast engaging the stream of glass conveying the same laterally or horizontally into contact with the surface 258 forming a film or layer of molten glass upon the surface 258. The rotor may be operated at comparatively high speed and the molten glass or other fiber-forming material delivered onto the surface is moved outwardly of the axis of the rotor under the influence of centrifugal forces. The molten material reaching the end zone 266 of the rotor is discharged outwardly in the form of a plurality of elongated bodies or primary filaments 267.

The bodies are projected into an attenuating blast emanating from a burner 80' of the character shown in detail in FIGURE 1. A combustible mixture delivered into the annular combustion chamber 84' through the mixture inlet pipes 96' is substantially completely burned within the chamber and the products of combustion discharged through the restricted orifice 108' as an intensely hot high velocity gaseous blast of a temperature above the softening or attenuation temperature of the glass or other fiber-forming material.

The orifice construction 108' is of generally annular shape providing an annular blast which is directed downwardly adjacent the periphery or end zone 266 of the rotor 250 and engages and attenuates the outwardly moving bodies into fine fibers F. The surface zone 266 of the rotor from which the material is discharged may be of uninterrupted or smooth contour or the surface may be serrated or radially grooved to form channels for the bodies of material extruded or projected outwardly from the end of the rotor. The rotor of this character may be made of relatively small or of large diameter depending upon the speed at which it is desired to operate the rotor and the character and size of fibers to be formed.

In the operation of this form of apparatus the glass stream S flows in a vertical direction into the interior of the rotor and the air blast from the nozzle 262 conveys the molten glass or fiber-forming material laterally or horizontally into engagement with the flared surface 258 of the rotor. The rotation of the rotor establishes or creates centrifugal forces which are effective on the molten glass distributed on the surface 258 to cause the glass to move to the zone of greatest diameter viz. the zone 266 of the rotor from which the material is extruded or projected outwardly. The blast from the orifice 108' engages the outwardly moving bodies and attenuates the bodies to fine fibers. The fibers may be collected upon a conveyor of the character shown in FIGURES 1, 3 and 4 or by any other suitable fiber collecting means.

The zone or region of the external flared or conically shaped rotor surface at which the molten glass or other molten material will be dispelled or thrown outwardly therefrom is dependent upon a correlation of the following conditions or factors, viz. the degree of taper or angularity of the flared surface with respect to the axis of rotation, the radial distance or dimension of the flared surface from the axis of rotation, the speed of rotation of the rotor and the viscosity of the molten material. For example, if a rotor having a flared surface of substantial taper and of comparatively large diameter is rotated at a relatively high speed and the glass is of low viscosity, the glass may be dispelled or discharged from the flared surface at a region spaced from the end thereof. Under the same operating conditions, a glass of higher viscosity may adhere to the flared surface and progress along the surface and is not dispelled until it reaches the end zone of greatest diameter of the flared surface.

The degree of taper of the flared surface, its radial distance from the axis of rotation and speed of rotation are factors determining the centrifugal forces effective to dispel the molten material from the flared or conically shaped surface. The surface tension of the molten material tending to resist separation from itself and causing it to cling or adhere to the flared surface are factors that oppose the action of centrifugal forces to project the material from the flared surface. The surface tension of molten glass and other molten mineral material varies with the viscosity characteristics.

Therefore, the point or region of the flared or conically shaped exterior surface at which the molten material is dispelled or thrown outwardly from the surface is that point or region at which centrifugal forces exceed the surface tension in the material. In those forms of the invention disclosed wherein the molten material is delivered onto an exterior flared surface to be discharged from the end of the flared surface, the factors above mentioned are correlated so that the centrifugal forces do not exceed the surface tension of the material until the material reaches the end zone of the flared surface at its largest diameter. It is to be understood that the material may be discharged outwardly from the exterior flared surface at other regions along its length by modifying the factors of centrifugal force and surface tension.

While the apparatus illustrated is especially adapted to establish and direct a gaseous blast of products of combustion at temperatures of upwards of 3000° F. well above the attenuating temperature of the material, it is to be understood that gaseous attenuating blasts such as steam, compressed air or other fluid may be utilized as an attenuating medium for forming fibers from the material projected from the rotor by centrifugal forces. The fibers formed by hot blast attenuation are relatively much finer in size than those formed by the use of attenuating blasts at temperatures below the attenuating temperature of the fiber-forming material.

FIGURE 7 illustrates a rotor adapted for rotation about a substantially horizontal axis in combination with means for applying heat to the glass in contact with the rotor. The rotor structure 270 is hollow and includes a hollow shaft or tubular portion 272 equipped with a sheave or pulley 273 driven from a motor (not shown) by a driving belt 274. The shaft portion 272 is integrally joined with a flared or frusto-conically shaped portion 275 which terminates in an outwardly extending flange 276.

The rotor structure 270 includes a circular cylindrical wall portion 278 and an end wall 280, the end wall provided with a plurality of vent openings 281. The rotor structure also includes a frusto-conically shaped portion 282, the latter being spaced laterally and concentric with the frusto-conically shaped portion 275. The rotor wall portions 275 and 282 are integrally joined by means of radially arranged spokes or ribs 284 which are circumferentially spaced in the manner illustrated in the form of the rotor construction shown in FIGURE 2.

The circular cylindrical wall 278 is formed with rows of comparatively small orifices or outlets 286. A feeder 288 connected with a receptacle, such as that shown at 10 in FIGURE 1, is provided with an orifice through which a stream S of glass flows onto the exterior frusto-conical surface of the rotor portion 275 and, under the influence of centrifugal forces is distributed over the surface of portion 275 and progresses toward the large end of portion 275, is deflected outwardly by the flange 276 and by centrifugal forces of rotation, is projected outwardly to the interior surface of the second frusto-conically shaped member 282.

The glass on the surface of portion 282, under the influence of rotation of the rotor, flows into the interior of the orificed wall portion 278 providing a comparatively thick film of glass 290 forming a supply for the orifices or outlets 286. The centrifugal forces of rotation of the rotor effects uniform distribution of the molten glass within the perforated portion 278 so that primary filaments 314 of uniform character are delivered outwardly of the rotor.

The hollow shaft portion 272 of the rotor structure is journalled in antifriction bearings 292 mounted in a suitable support 294 which may be a portion of a housing similar to that illustrated in FIGURE 1. The rotor construction illustrated in FIGURE 7 is of a character wherein heat may be applied to the rotor structure or directed onto the glass so as to maintain the glass in a flowable condition to promote effective distribution of the glass along the frusto-conically shaped surface and the interior surface of the cylindrical wall portion 278.

The distal end of the shaft 272 is secured to a fitting 296 having a hollow ball-shaped portion 298 which is encased in a fitting 300. A suitable sealing bushing or sleeve 302 is disposed between the ball-shaped portion 298 and the fitting 300 to facilitate rotation of the fitting 296 carried by the shaft with respect to the stationary fitting 300. The fitting 300 is formed with a tubular elbow 304 connected with a pipe or tube 305.

The tube 305 is arranged to be connected with a supply of fuel and air mixture which is under sufficient pressure to effect a flow of combustible mixture through tube 305, the elbow 304, through the ball shaped fitting 298 and hollow shaft 272 into the region or chamber 307 defined by the frusto-conically shaped portion 275. A fire screen comprising a member 309 is arranged in the region of juncture of portion 275 with the hollow shaft portion 272. The member 309 is formed with a comparatively large number of small channels or passages 310 which functions as a fire screen to prevent preignition of the mixture in advance of the screen member 309.

The combustible mixture is ignited and burns within the confined zone or chamber 307. The rotor structure is made of metal or metal alloy which is resistant to high temperatures, an alloy of platinum and rhodium being preferably employed for the purpose although other high temperature resistant alloys or metals may be used. The hot gases of combustion within the chamber 307 heat the walls of portion 275 and are effective to maintain the glass in contact with the portion 275 in a flowable condition.

The gases of combustion move through the interior region defined by the cylindrical wall portion 278 and the heat of the gases assists in maintaining the glass at the region 290 in a flowable condition. The gases or products of combustion may be vented through the openings 281 in the rotor wall 280.

A plurality of burners 312 may be disposed in the positions illustrated for directing combustible mixtures in the annular space between the frusto-conically shaped portions 275 and 282 to apply heat to the glass and to the adjacent rotor structure. Several burners 312 may be circumferentially spaced around the frusto-conically shaped portion 275.

The primary filaments 314 extruded from the orifices 286 by centrifugal forces are adapted to be engaged by an annular gaseous blast from a blower 316 or other means for delivering a high velocity gaseous blast. The blower illustrated comprises annular mating components 318 and 320 secured together by screws 321. The components 318 and 320 define an annularly shaped manifold or chamber 322 which may be supplied with high pressure steam or compressed air from a supply through a tube or pipe 323.

The components 318 and 320 are shaped to provide an annular restricted orifice or nozzle 325 through which gases under pressure in the chamber 322 are delivered in a path generally lengthwise of the axis of the rotor and concentric with the peripheral wall 278 thereof. The high velocity gaseous blast engages the primary filaments 314 and draws or attenuates the filaments to fine fibers F which may be collected, for example, in the manner illustrated in FIGURE 1.

In the operation of the arrangement shown in FIGURE 7, the rotor 270 is rotated to project the material through the orifices 286 by centrifugal forces to form the primary filaments 314. The ball joint structure 298—300 facilitates rotation of the shaft 272 with respect to the stationary elbow 304, the bearing gasket or sleeve 302 providing an effective seal for the rotatable joint.

The combustible mixture flows through the hollow shaft and is ignited and burns within the chamber 307 to apply heat to the adjacent rotor structure and the glass. If additional heat is desired, the burners 312 may be employed for the purpose. While the blower 316 illustrated in FIGURE 7 is especially adapted for delivering a gaseous blast such as steam under pressure or compressed air for fiber attenuating purposes, it is to be understood that other gases under pressure or products of combustion provided by the combustion burner shown in FIGURE 1 may be employed as attenuating blasts.

FIGURE 8 illustrates a rotor construction similar to that shown in FIGURE 7 in combination with another form of means for applying heat to the rotor 270'. The rotor includes the frusto-conically shaped portions 275' and 282' and the peripheral wall 278'. The blower construction 316' providing an attenuating blast is the same as illustrated in FIGURE 7.

Surrounding the frusto-conically shaped portion 282' is a cylindrically-shaped member or wall 330 which, with the rotor portion 282', forms an annular chamber 332. Disposed adjacent the rear edge of wall 330 and surrounding the rotor portion 282' is an annularly-shaped hollow member 333 forming an annular chamber or manifold 334. A pipe 335 is connected with the member 333 for conveying combustible mixture into the chamber 334. The front wall of member 333 is provided with an annular opening in which is mounted a fire screen 337 comprising a member formed with a large number of small passages 338 through which the combustible mixture under comparatively low pressure is delivered from the manifold chamber 334.

The mixture delivered into the annular chamber 332 is ignited and burns within the zone or chamber 332 to apply heat to the portion 282' of the rotor. The products of combustion from the chamber 332 flow along the exterior surface of the cylindrical wall portion 278' supplying heat for the primary filaments 314' to assist in maintaining the primary filaments at a proper viscosity for efficient attenuation. Supplemental burners 312' may be employed for supplying heat in a region 339 between the rotor portions 275' and 282'.

FIGURE 9 illustrates another form of burner arrangement for applying heat interiorly of the frusto-conically shaped and circular cylindrical portions of a rotor. The rotor 340 is of the same character as the rotor 270 but without the ball joint construction for the shaft portion 341. A stationary rigid pipe or tube 344 extends through the hollow shaft portion 341 of the rotor. The tube 344 supports a first burner 346 arranged in the zone or chamber 307' defined by the portion 275' and a second burner 348 of larger diameter disposed within the cylindrical portion 278' of the rotor 340.

The burners 346 and 348 are preferably of circular shape the peripheries of which are formed with a plurality of circumferentially spaced orifices or outlets 350 and 352 respectively. Combustible mixture such as fuel gas and air under comparatively low pressure is delivered from a supply through the pipe 344 to the burners 346 and 348 and is projected through the peripheral orifices 350 and 352. The rotor is mounted in bearings 342 and rotated by a belt driven sheave 343.

The mixture is ignited and burned exteriorly of the burners in the region 307' of the rotor portion 275' and in the region defined by the cylindrical wall 278' and the rotor end wall 280'.

The gases of combustion within the rotor structure are vented through the openings 281' in the end wall 280' and through the annular space 354 between the portions 275' and 282'. The primary filaments 314' projected through orifices in the wall 278' may be attenuated to fibers F by an annular gaseous blast from a blower construction 316'' or by a blast of hot gases from an annular burner 80 of the character shown in FIGURE 1.

The stream of glass S is delivered from a feeder onto the exterior surface of the rotor portion 275' and flows forwardly and is delivered outwardly by centrifugal forces onto the interior of the peripheral wall 278' and through the orifices in the wall 278' forming the primary filaments 314' which are attenuated to fibers.

FIGURE 10 illustrates a rotor construction 360 disposed in a vertical position and rotatable about a vertical axis. The rotor 360 is journally supported in antifriction bearings 362 mounted upon a stationary support (not shown). The rotor is fashioned with a hollow shaft portion 363 provided with a pulley 364 driven by a belt 365 from an electric motor or other power means. The rotor is formed with a frusto-conically shaped portion 366 which terminates in an outwardly extending circular flange 368, the lower edge 369 of which is serrated or notched circumferentially as in the form of rotor of FIGURE 6.

Extending into and through the hollow shaft-like portion 363 is a stationary tube 372 provided with a nozzle or fitting 373 within the frusto-conically shaped portion 366, the outlet 374 of the fitting 373 being disposed normal to the axis of rotation of the rotor. A stream of glass S or other molten mineral material is flowed from a feeder into and through the hollow shaft portion 363 to a zone in front of the nozzle outlet 374. A combustible mixture of fuel gas and air under pressure may be delivered through the tube or pipe 372 and discharged from the nozzle outlet 374 and the mixture ignited exteriorly of the nozzle outlet.

The burning mixture engages and propels the glass of the stream S into engagement with the interior surface of the frusto-conically shaped portion 366 of the rotor to provide a film 376 of molten glass which, under the influence of centrifugal forces, flows toward the flange 368 of the rotor, the molten glass discharged from the flange being separated into fine streams or primary filaments 378 by the serrations in the edge region 369 of the flange.

A blower construction 316a is arranged adjacent the glass discharge end region of the rotor, the blower being of the character illustrated in FIGURE 7 adapted to direct an annular high velocity blast of steam or compressed air or other gas into engagement with the primary filaments 378 to attenuate the filaments to fibers F which may be collected upon a suitable conveyor or collecting surface (not shown).

The combustible mixture delivered from the outlet 374 burns within the chamber or region 380 defined by the portion 366. Thus the combustible mixture delivered from the orifice 374 serves dual purposes of projecting or propelling the glass of the stream S into contact with the portion 366 of the rotor and burns in the region 380 to maintain the glass of the film 376 in a flowable condition for discharge from the rotor by centrifugal forces.

FIGURE 11 illustrates a rotor construction 384 similar to the rotor 360 and is arranged for rotation about a vertical axis. The rotor 384 is fashioned with a tapered or frusto-conically shaped portion 385, a hollow shaft-like or tubular portion 386 provided with a pulley or sheave 387 which is rotated by a belt connected with an electric rotor or other source of power. The rotor is journalled in suitable bearings 388.

A stream of glass S is flowed from a feeder into and through the hollow shaft portion 386. Extending through the shaft-like portion 386 is a stationary tube 372' provided at its lower end with a nozzle fitting 373'. Compressed air is delivered through the tube 372' and from the nozzle or outlet of the fitting 373 into engagement with the glass stream S, the velocity of the air jet or blast from the fitting propelling the glass laterally into contact with the interior surface of the portion 385, the glass flowing downwardly and outwardly over the serrated edge 369' of the flange 368' of the rotor to form primary filaments 378'.

Also extending through the hollow shaft portion 386 is a stationary tube or pipe 390 which supports at its lower end an annularly shaped burner 392 disposed within the flared or tapered portion 385 of the rotor. The periphery of the burner 392 is provided with circumferentially spaced orifices or outlets 394. Fuel gas, under comparatively low pressure, is delivered through the pipe 390 and outwardly from the burner 392 through the orifices 394. The fuel gas is ignited and burns within the region 380' within the rotor portion 385 as the fuel from the burner mixes with the air within the rotor supplemented by the compressed air delivered through the nozzle fitting 373'.

In this arrangement the compressed air delivered from the fitting 373' propels the glass of the stream S into contact with the rotor component 385 and provides supplemental air for supporting combustion of the fuel to supply heat for maintaining the glass within the rotor in a flowable condition. A blower or blast producing means 316b surrounds the rotor and is adapted to deliver an annularly shaped high velocity gaseous blast into engagement with the outwardly moving primaries 378' to attenuate the glass of the primaries to fibers F.

FIGURE 13 is a sectional view of a vertically arranged rotor similar to FIGURE 11. In this form, a relatively stationary burner 400 is disposed within the tapered portion 385' of the rotor 384'. A stationary tube 402 extends through the hollow shaft portion 386' and is connected with and supports the circularly shaped burner 400.

A stationary tube 372a is provided with an orificed fitting or nozzle 373a through which compressed air or other gas under pressure is projected as a blast for conveying the material of the glass stream S onto the interior surface of the portion 385' of the rotor.

The tube 402 conveys fuel gas to the burner 400, the fuel gas being projected from orifices 404 formed in the periphery of the circular burner 400. The fuel projected from the orifices 404 is ignited adjacent the burner and burns in the region 380a of the rotor, the air projected through the orificed fitting 373a supporting combustion.

Through this arrangement, the film of glass on the interior surface of the rotor portion 385' is supplied with heat and maintained in flowable condition. The blower 316c supplies a high velocity annular blast which engages the primary filaments or fine streams of glass projected from the serrated edge 369a of the rotor to attenuate the primaries or fine streams to fibers F in the same manner as described in connection with the other forms of the invention.

FIGURE 14 is a longitudinal sectional view of a horizontally disposed rotor adapted for rotation about a substantially horizontal axis, the arrangement including a method and means for supplying heat interiorly and exteriorly of the rotor construction by electric energy. The rotor 410 is of substantially the same construction as the rotor 340 shown in FIGURE 9.

The hollow shaft portion 341a is journalled in suitable bearings 342a and is rotated by a motor driven belt engaging the pulley 343a. The arrangement includes an electrically energized resistance heater for supplying heat to the interior of the frusto-conically shaped portion 275a.

The heater includes a coil 412 supported by a member 414 of ceramic or other heat resistant insulating material, the member having a hollow cylindrical shank 416 projecting through the hollow shaft portion 341a and is carried by a support bracket 417 mounted upon a suitable support (not shown). Current conductors 418 and 419 extend through the portion 416 and supply electric energy from a suitable source to the heating coil 412. The heat radiated from the energized coil 412 heats the rotor portion 275a and hence maintains the glass of the stream S delivered onto the portion 275a in a flowable condition.

An induction heating unit or coil 422 is spaced from and surrounds the portion 275a of the rotor and inductively heats the rotor portion 275a and thereby assists in maintaining the glass on said portion in a flowable condition. A second induction heating means or coil 426 surrounds the frusto-conically shaped portion 282a of the rotor and provides inductive heat for the portion 282a of the rotor which also assists in maintaining the glass in the region defined by the circular cylindrical wall 278a in a flowable condition. The coils 422 and 426 are supplied with high frequency current for the purpose.

The peripheral wall 278a of the rotor is provided with orifices through which the molten glass adjacent the wall is projected to form primary filaments 314a of glass which are attenuated to fibers F by high velocity gaseous blasts emanating from an annular orifice of an annularly shaped blower or blast producing means 316c as in the arrangement shown in FIGURES 7 and 9.

It is to be understood that the heating units 412, 422 and 426 may be employed in the combination illustrated in FIGURE 14, or they may be used individually or in other combinations dependent upon the region at which it is desired to supply or transfer heat to a rotor component or portion and the glass or other heat-softened material being processed through the use of a rotor.

FIGURES 15 and 16 illustrate an apparatus similar to FIGURE 5 wherein molten or heat-softened glass or other fiber forming material is introduced into the interior of a horizontally disposed, frusto-conical shaped rotor. The hollow rotor 430, disposed for rotation about a substantially horizontal axis, is formed with an interior surface 432 of flaring or frusto-conical shape. The rotor is journaled in anti-friction bearings 434 mounted in a stationary support 435. The rotor is equipped with a pulley or sheave 436 driven by a belt 437 from an electrically energizable motor (not shown) or other source of power, the rotor being preferably of comparatively small diameter and adapted to be rotated at high speeds.

A stream of glass S flows from a feeder 438 into a spout or trough 440, the end of which extends into the zone of smallest diameter of rotor 430 whereby the molten glass is delivered into the interior thereof. Under the influence of centrifugal forces of high speed rotation of the rotor, the molten glass is distributed over the surface 432 in a thin film moving toward the end of large diameter of the rotor and is discharged outwardly at the large end.

The edge region of the rotor at the large diameter end may be serrated as shown at 442 to facilitate the formation of the outwardly moving glass into linear bodies or primary filaments 444. An annular gaseous blast from a blower 316d attenuates the primary filaments to fibers F. The apparatus is inclusive of means for applying heat to the rotor and to the glass or other material contained in the rotor in order that the glass may be maintained in flowable condition. Extending into the interior of the rotor through the small end thereof is a relatively stationary pipe or tube 446 extending axially of the rotor and formed with orifices 448 providing a burner or heating means within the rotor.

A combustible mixture of fuel gas and air may be conveyed through the pipe 446, discharged through the orifices 448, and ignited and burned within the interior of the rotor to maintain the glass at a comparatively high temperature. It will be noted from FIGURE 16 that the tube or pipe 446 is spaced from the trough 440 so as not to impair the delivery of glass into the rotor or impede its flow along the rotor surface 432.

Electric energy may be utilized to heat the glass in the trough 440 using the trough as a resistance element. The trough may be provided at its end regions with terminals 450 and 451 connected with a source of electric energy of comparatively low voltage and high amperage to maintain the trough 440 at a comparatively high temperature.

The rotor may also be heated by electric induction. As shown in FIGURE 15, an inductive heater or coil 454 surrounds the rotor 430 and may be supplied with high frequency current to inductively heat the rotor. It is to be understood that internal and external heating for the rotor as shown in FIGURE 15 may be employed in combination, or one or the other used as desired depending upon the operating conditions and the composition of the glass or other fiber-forming material being processed by the apparatus.

It is apparent that, within the scope of the invention, modifications and different arrangements may be made other than as herein disclosed, and the present disclosure is illustrative merely, the invention comprehending all variations thereof.

I claim:

1. Apparatus of the character disclosed, in combination, a shaft mounted for rotation about a substantially horizontal axis and of relatively small diameter formed with a conically-shaped portion, means for rotating said shaft at relatively high speed, means for delivering molten fiber-forming material onto the conically-shaped portion of the shaft at a region of reduced diameter whereby the material is conveyed lengthwise along the conically-shaped surface toward one end of said shaft to a discharge zone and delivered outwardly from the surface by centrifugal forces of rotation, means for directing heat onto the conically-shaped portion of the shaft, means formed on the shaft at the discharge zone adapted to subdivide the material into streams, and means surrounding the shaft for projecting a gaseous attenuating blast into engagement with the outwardly moving material of the streams to form the material into fibers.

2. Apparatus of the character disclosed, in combination, means for establishing a supply of molten fiber-forming material, a shaft mounted for rotation about a substantially horizontal axis and having a frusto-conically shaped surface, burner means arranged to apply heat of gases of combustion to the frusto-conically shaped surface, a feeder associated with the supply arranged to deliver a stream of the molten material onto a small diameter region of the frusto-conically shaped surface, means for rotating the member at a speed whereby centrifugal forces move the material generally axially along the frusto-conically shaped surface toward the end of the shaft of increased diameter to a discharge zone at which the material is delivered outwardly from the said surface, means surrounding the shaft for establishing an annularly shaped gaseous blast and directing the blast into engagement with the outwardly moving material to attenuate the material to fibers.

3. Apparatus of the character disclosed, in combination, means for establishing a supply of molten fiber-forming material, a rotor mounted for rotation about a substantially horizontal axis and formed with a frusto-conically shaped portion, feeding means arranged to deliver a stream of the fiber-forming material from the supply onto a small diameter region of the frusto-conically shaped portion of the rotor, electrically energizable means for heating the frusto-conically shaped portion of the rotor, means for rotating the rotor at high speed whereby the material on the rotor is moved toward a larger diameter region of the frusto-conically shaped portion and is discharged outwardly therefrom by centrifugal forces in the form of primary filaments, and means surrounding the rotor for directing an annular gaseous blast into engagement with the primary filaments to attenuate the filaments to fibers.

4. A method of forming fibers from heat-softenable mineral material including establishing a supply of molten mineral material, delivering a stream of the molten material onto a small diameter region of a cone-shaped surface, rotating the surface about a substantially horizontal axis to cause a thin film of the molten material to flow along the surface, inductively heating by electric energy the surface and film of material thereon, projecting the material away from the cone-shaped surface by centrifugal forces, and engaging the projected material by a high velocity annular gaseous blast to attenuate the projected material to fibers.

5. A method of forming fibers from heat-softenable mineral material including establishing a supply of molten mineral material, flowing a stream of material into a hollow body, conveying combustible mixture under pressure to the interior of the hollow body, directing a blast of the combustible material mixture into contact with the stream of material to propel the material onto a surface of the hollow body, burning the combustible mixture to transfer heat to the hollow body and the molten material, rotating the hollow body to project the material outwardly from the surface, and engaging the projected material by a high velocity gaseous blast to attenuate the material to fibers.

6. Apparatus of the character disclosed, in combination, means for establishing a supply of molten fiber-forming material, a rotor formed with a frusto-conically shaped portion arranged for rotation about a vertical axis, feeding means arranged to deliver a stream of the fiber-forming material from the supply into the interior of the frusto-conically shaped portion of the rotor, tubular means arranged to convey combustible mixture under pressure into the rotor, a nozzle connected with the tubular means arranged to direct a jet of the mixture in engagement with the stream to propel the material of the stream into contact with the frusto-conically shaped portion, means for rotating the rotor at high speed whereby the material on the rotor is discharged outwardly therefrom by centrifugal forces in the form of primary filaments, and means for directing a gaseous blast into engagement with the primary filaments to attenuate the filaments to fibers.

7. Apparatus of the character disclosed, in combination, means for establishing a supply of molten fiber-forming material, a hollow rotor rotatable about a substantially vertical axis, means for flowing a stream of the molten material into the interior of the rotor, a first tube extending into the rotor adapted to convey compressed air, a second tube extending into the rotor for delivering combustible into the rotor, a nozzle connected with said first tube arranged to direct a jet of compressed air against the stream of material to propel the material of the stream into engagement with an interior surface of the rotor, means for rotating the rotor, the air of the jet and the combustible being adapted to be burned within the rotor to establish a high temperature within the rotor, means on said hollow rotor adapted to subdivide the material projected outwardly by centrifugal forces into a plurality of linear bodies, and means for directing a gaseous blast into engagement with the outwardly moving bodies to attenuate the material of the bodies to fibers.

References Cited by the Examiner

UNITED STATES PATENTS

| 2,192,944 | 3/1940 | Thomas. | |
| 2,238,204 | 4/1941 | Woods. | |
| 2,294,588 | 9/1942 | Von Pazsiczky. | |
| 2,431,205 | 11/1947 | Slayter | 18—2.6 |
| 2,514,627 | 7/1950 | Cook. | |
| 2,577,431 | 12/1951 | Powell | 18—2.6 |
| 2,603,833 | 7/1952 | Stalego et al. | 18—2.6 |
| 2,609,566 | 9/1952 | Slayter et al. | |
| 2,624,912 | 1/1953 | Heymes et al. | |
| 2,682,079 | 6/1954 | Richardson. | |
| 2,707,847 | 5/1955 | Anliker. | |
| 2,839,782 | 6/1958 | Tillotson | 18—2.6 |
| 2,863,493 | 12/1958 | Snow et al. | |
| 2,936,480 | 5/1960 | Kleist | 65—12 X |
| 2,980,952 | 4/1961 | Stalego | 65—111 |
| 3,014,235 | 12/1961 | Snow. | |
| 3,044,110 | 7/1962 | Hess | 65—14 |
| 3,058,322 | 10/1962 | Erard | 65—14 |

FOREIGN PATENTS 1,175,351  11/1958  France.

DONALL H. SYLVESTER, *Primary Examiner.*

MICHAEL V. BRINDISI, ARTHUR P. KENT, MORRIS O. WOLK, *Examiners.*